UNITED STATES PATENT OFFICE.

ROBERT J. PATTISON, OF NEW YORK, N. Y., ASSIGNOR TO CATHARINE A. PATTISON, OF SAME PLACE.

COMPOSITION OF MATTER FOR FIRE AND WATER PROOF COVERING FOR ROOFS AND WALLS, &c.

SPECIFICATION forming part of Letters Patent No. 284,055, dated August 28, 1883.

Application filed February 10, 1883. (No specimens.)

*To all whom it may concern:*

Be it known that I, ROBERT J. PATTISON, of the city, county, and State of New York, have invented a new and useful composition of matter for fire and water proof covering for roofs and walls and dead-filling for floors, walls, &c., or to be cast in molds for interior or exterior ornamentation, of which the following is a full, clear, and exact description.

My composition consists of the ingredients combined in about the proportions stated, viz: mineral wool, fifty pounds; plaster-of-paris, thirty-three and one-third pounds; oil, (lard-oil preferred,) eight and one-third pounds; liquid glue, (dextrine preferred,) eight and one-third pounds. These ingredients are to be mixed together and poured into a mold, or put on as a mortar and left until it hardens or sets, or, when molded, subjected to a heat of from 100° to 160° Fahrenheit.

Having thus described my invention, I claim as new and desire to secure by Letters Patent—

The herein-described composition of matter, consisting of mineral wool, plaster-of-paris, oil, and glue, in about the proportions specified.

ROBERT J. PATTISON.

Witnesses:
H. A. WEST,
C. SEDGWICK.